United States Patent
Tanuma

(10) Patent No.: US 12,362,366 B2
(45) Date of Patent: Jul. 15, 2025

(54) CATALYST LAYER, MEMBRANE ELECTRODE ASSEMBLY FOR SOLID POLYMER FUEL CELL, AND SOLID POLYMER FUEL CELL

(71) Applicant: AGC Inc., Tokyo (JP)

(72) Inventor: Toshihiro Tanuma, Tokyo (JP)

(73) Assignee: AGC Inc., Tokyo (JP)

(*) Notice: Subject to any disclaimer, the term of this patent is extended or adjusted under 35 U.S.C. 154(b) by 465 days.

(21) Appl. No.: 17/847,276

(22) Filed: Jun. 23, 2022

(65) Prior Publication Data

US 2022/0328847 A1    Oct. 13, 2022

Related U.S. Application Data

(63) Continuation of application No. PCT/JP2020/047545, filed on Dec. 18, 2020.

(30) Foreign Application Priority Data

Dec. 24, 2019   (JP) .................. 2019-232523

(51) Int. Cl.
   *H01M 4/92* (2006.01)
   *H01M 4/86* (2006.01)
   (Continued)

(52) U.S. Cl.
   CPC ......... *H01M 4/926* (2013.01); *H01M 4/8605* (2013.01); *H01M 8/1004* (2013.01);
   (Continued)

(58) Field of Classification Search
   CPC ............... H01M 4/926; H01M 4/8605; H01M 8/1004; H01M 8/1018; H01M 2008/1095;
   (Continued)

(56) References Cited

U.S. PATENT DOCUMENTS

| | | | |
|---|---|---|---|
| 2016/0093892 A1 | 3/2016 | Hori et al. | |
| 2018/0301726 A1* | 10/2018 | Shintani | H01M 4/926 |
| 2019/0348684 A1* | 11/2019 | Arai | H01M 4/88 |

FOREIGN PATENT DOCUMENTS

| | | |
|---|---|---|
| CN | 105229834 A | 1/2016 |
| CN | 110474054 A | 11/2019 |
| | (Continued) | |

OTHER PUBLICATIONS

Young-Chul Park et al., "Effects of carbon supports on Pt distribution, ionomer coverage and cathode performance for polymer electrolyte fuel cells", Journal of Power Sources, vol. 315, Mar. 21, 2016, pp. 179-191.

*Primary Examiner* — Daniel S Gatewood D
(74) *Attorney, Agent, or Firm* — Element IP, PLC

(57) ABSTRACT

A catalyst layer including: a catalyst-supported carbon including a catalyst including platinum supported on a carbon carrier; and an ionomer, in which the catalyst-supported carbon has a mesopore having a pore diameter of from 2 nm to less than 10 nm in a pore distribution obtained by a nitrogen adsorption method, at least a part of the ionomer exists in the mesopore having a pore diameter of from 2 nm to less than 10 nm, a content of the ionomer with respect to 100 parts by mass of the carbon carrier is 100 parts by mass or more, and an occupancy rate of the ionomer in a total volume of the mesopore having a pore diameter of from 2 nm to less than 10 nm is 50% by volume or less.

11 Claims, 1 Drawing Sheet

(51) Int. Cl.
  *H01M 8/10*    (2016.01)
  *H01M 8/1004*  (2016.01)
  *H01M 8/1018*  (2016.01)

(52) U.S. Cl.
  CPC .................. *H01M 8/1018* (2013.01); *H01M 2008/1095* (2013.01); *H01M 2300/0082* (2013.01)

(58) Field of Classification Search
  CPC ........... H01M 2300/0082; H01M 4/86; H01M 4/8663; H01M 4/8668; H01M 4/88; H01M 4/9083; H01M 4/92; H01M 4/921; H01M 4/96; H01M 8/10; B01J 35/23; B01J 35/393; B01J 35/613; B01J 35/63; B01J 21/18; B01J 31/10; B01J 35/647; B01J 37/0219; B01J 23/42; B01J 35/60; Y02E 60/50
  See application file for complete search history.

(56) References Cited

FOREIGN PATENT DOCUMENTS

| | | | |
|---|---|---|---|
| JP | 2010167379 | A | 8/2010 |
| JP | 2010186678 | A | 8/2010 |
| JP | 2011081977 | A | 4/2011 |

\* cited by examiner

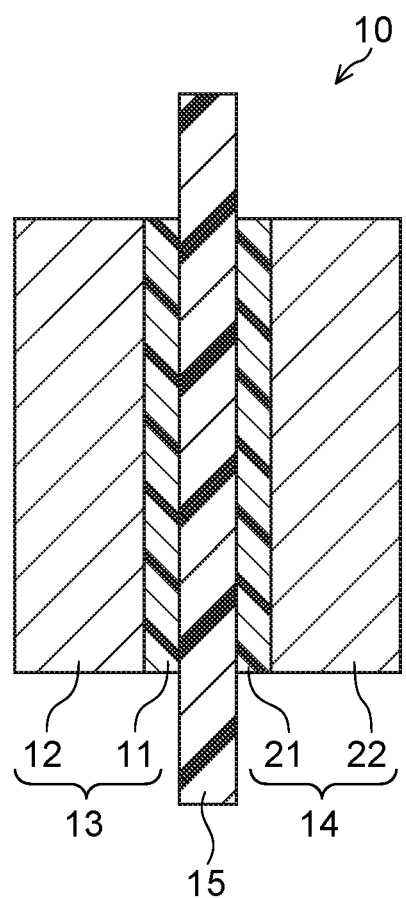

CATALYST LAYER, MEMBRANE ELECTRODE ASSEMBLY FOR SOLID POLYMER FUEL CELL, AND SOLID POLYMER FUEL CELL

CROSS-REFERENCE TO RELATED APPLICATIONS

This application is a Continuation Application of International Application No. PCT/JP2020/047545, filed Dec. 18, 2020, the disclosure of which is incorporated herein by reference in its entirety. Further, this application claims priority from Japanese Patent Application No. 2019-232523, filed Dec. 24, 2019, the disclosure of which is incorporated herein by reference in its entirety.

TECHNICAL FIELD

The present disclosure relates to a catalyst layer, a membrane electrode assembly for a solid polymer fuel cell, and a solid polymer fuel cell.

BACKGROUND ART

The solid polymer fuel cell is, for example, one in which a cell is formed by sandwiching a membrane electrode assembly between two separators and a plurality of the cells are stacked.

The membrane electrode assembly includes, for example, an anode having a catalyst layer and a gas diffusion layer, a cathode having a catalyst layer and a gas diffusion layer, and a polymer electrolyte membrane disposed between the anode and the cathode.

The catalyst layer used for the anode and the cathode is configured to include, for example, a catalyst carrier formed by carrying a catalyst on a carrier, and an ionomer which is a polymer electrolyte.

Since platinum mainly used as a catalyst is expensive, it is desired to reduce an amount of catalyst used. Thus, in order to efficiently utilize the catalyst, attempts have been made to increase an output of a fuel cell while reducing the amount of catalyst used by coating many catalyst particles as uniformly as possible with an ionomer (for example, Patent Documents 1 to 3).

Patent Document 1: Japanese Patent Application Laid-Open (JP-A) No. 2010-167379
Patent Document 2: Japanese Patent Application Laid-Open (JP-A) No. 2010-186678
Patent Document 3: Japanese Patent Application Laid-Open (JP-A) No. 2011-081977

SUMMARY OF INVENTION

Technical Problem

As described above, it has been conventionally considered that it is necessary to coat many catalyst particles as uniformly as possible with an ionomer in order to form a wide three-phase interface of a catalyst, an ionomer, and water as a reaction field in a catalyst layer in order to achieve both reduction in the amount of catalyst used and high output of a fuel cell.

However, when a catalyst containing platinum is used as a catalyst, it is required to further increase the output of the fuel cell while reducing the amount of catalyst used.

The present disclosure has been made in view of the above circumstances, and an object of the present disclosure is to provide a catalyst layer that is used in a solid polymer fuel cell to achieve high output of the fuel cell while reducing an amount of catalyst used, a membrane electrode assembly for a solid polymer fuel cell using the catalyst layer, and a solid polymer fuel cell including the membrane electrode assembly for a solid polymer fuel cell.

Solution to Problem

Specific means for achieving the above object are as follows.
<1> A catalyst layer including a catalyst-supported carbon including a catalyst including platinum supported on a carbon carrier, and an ionomer,
in which the catalyst-supported carbon has a mesopore having a pore diameter of from 2 nm to less than 10 nm in a pore distribution obtained by a nitrogen adsorption method,
at least a part of the ionomer exists in the mesopore having a pore diameter of from 2 nm to less than 10 nm,
a content of the ionomer with respect to 100 parts by mass of the carbon carrier is 100 parts by mass or more, and
an occupancy rate of the ionomer in a total volume of the mesopore having a pore diameter of from 2 nm to less than 10 nm is 50% by volume or less.
<2> The catalyst layer according to <1>, in which the catalyst-supported carbon in the catalyst layer has 0.03 $cm^3/g$ catalyst or more of a macropore having a pore diameter of 50 nm or more, in the pore distribution obtained by the nitrogen adsorption method, in a state in which the ionomer is attached.
<3> The catalyst layer according to <1> or <2>, in which a content of the catalyst per unit area of the catalyst layer is 0.2 $mg/cm^2$ or less.
<4> The catalyst layer according to any one of <1> to <3>, in which the catalyst includes at least one selected from the group consisting of platinum particles and platinum alloy particles.
<5> The catalyst layer according to <4>, in which the catalyst has a number average particle diameter of 1 nm to 20 nm.
<6> The catalyst layer according to any one of <1> to <5>, in which a content ratio of the catalyst with respect to the entire catalyst-supported carbon is from 10% by mass to 70% by mass.
<7> A membrane electrode assembly for a solid polymer fuel cell including:
an anode including a first gas diffusion layer and a first catalyst layer provided at one surface side of the first gas diffusion layer;
a cathode including a second gas diffusion layer and a second catalyst layer provided at one surface side of the second gas diffusion layer; and
a polymer electrolyte membrane disposed between the first catalyst layer and the second catalyst layer,
in which at least one of the first catalyst layer or the second catalyst layer is the catalyst layer according to any one of <1> to <6>.
<8> A solid polymer fuel cell, including the membrane electrode assembly for a solid polymer fuel cell according to <7>.

Advantageous Effects of Invention

According to the present disclosure, it is possible to provide a catalyst layer that is used in a solid polymer fuel cell to achieve high output of the fuel cell while reducing an amount of catalyst used, a membrane electrode assembly for a solid polymer fuel cell using the catalyst layer, and a solid polymer fuel cell including the membrane electrode assembly for a solid polymer fuel cell.

BRIEF DESCRIPTION OF DRAWINGS

FIG. 1 is a schematic cross-sectional view showing an example of a membrane electrode assembly for a solid polymer fuel cell.

DESCRIPTION OF EMBODIMENT

Hereinafter, modes for carrying out the present disclosure will be described in detail. However, the present disclosure is not limited to the following embodiment. In the following embodiment, the constituents thereof (including elemental steps or the like) are not necessarily indispensable unless otherwise specified. The same applies to the numerical values and ranges thereof, and the present disclosure is not restricted by these elements.

In the present specification, the term "process" denotes not only independent processes independent from other processes but also processes that cannot be clearly distinguished from other processes as long as a purpose is accomplished by the process.

In the specification, the numerical range represented by "from A to B" includes A and B as a minimum value and a maximum value, respectively.

In the present specification, each component may contain a plurality of corresponding substances. When there are a plurality of substances corresponding to each component in the composition, the content ratio or the content of the component refers to a total content ratio or content of the plurality of substances present in the composition, unless otherwise stated.

In the description of embodiments with reference to the drawings in the present specification, the configurations of the embodiments are not limited to the configurations shown in the drawings. The sizes of the members in each of the drawings are conceptual sizes, and the relative relationship between the sizes of the members is not limited to that shown in the drawings.

[Catalyst Layer]

A catalyst layer in the present embodiment is a catalyst layer containing catalyst-supported carbon in which a catalyst containing platinum is supported on a carbon carrier, and an ionomer.

Although the mesopore generally means a pore having a pore diameter of from 2 nm to less than 50 nm, in the present embodiment, among the mesopores, in the mesopore having a pore diameter of from 2 nm to less than 10 nm, an ionomer that occupies a specific proportion of the volume exists. That is, the catalyst-supported carbon has a mesopore having a pore diameter of from 2 nm to less than 10 nm in a pore distribution obtained by a nitrogen adsorption method, at least a part of the ionomer exists in the mesopore having a pore diameter of from 2 nm to less than 10 nm, a content of the ionomer with respect to 100 parts by mass of the carbon carrier is 100 parts by mass or more, and an occupancy rate of the ionomer in a total volume of the mesopore having a pore diameter of from 2 nm to less than 10 nm is 50% by volume or less.

Hereinafter, the pore distribution obtained by the nitrogen adsorption method is also simply referred to as "pore distribution", pores having a pore diameter of from 2 nm to less than 50 nm are also referred to as "mesopores", mesopores having a pore diameter of from 2 nm to less than 10 nm in the pore distribution are also referred to as "specific mesopores", and an occupancy rate of the ionomer in the total volume of the specific mesopores is also referred to as the "ionomer occupancy rate". The term "macropore" described later means pores having a pore diameter of from 50 nm to less than 300 nm.

The "pore distribution" is obtained by analyzing a sample to be measured by a BJH method using an automatic specific surface area/pore distribution measuring device (for example, manufactured by Shimadzu Corporation, model number: Tri Star II 3020, measurement method: nitrogen adsorption method by constant volume method). The specific surface area and the pore capacity of the catalyst-supported carbon to be described later are calculated from the pore distribution.

The "ionomer occupancy rate" is a value represented by the following formula (1), in which $P_1$ is the total volume of the specific mesopores obtained by performing the above measurement and analysis on a sample of the catalyst-supported carbon to which the ionomer is attached, and $P_0$ is the total volume of the specific mesopores obtained by performing the above measurement and analysis on a sample of the catalyst-supported carbon to which no ionomer is attached. The total volume of the specific mesopores means a total pore area of the specific mesopores.

$$\text{Ionomer occupancy rate (\% by volume)} = (P_0 - P_1) \times 100/P_0 \quad (1)$$

As a sample of the catalyst-supported carbon to which the ionomer is attached, for example, a catalyst layer-forming coating liquid is applied onto a base film such as a PET film, dried at 80° C. to remove a solvent, and thus to form a coating layer, the obtained coating layer is scraped off into a powder, and the powder is used as the sample.

On the other hand, as a sample of the catalyst-supported carbon to which the ionomer is not attached, for example, a mixture of the catalyst-supported carbon and the solvent is applied onto a base film such as a PET film, dried to remove the solvent, and thus to form a coating layer, the obtained coating layer is scraped off into a powder, and the powder is used as the sample. Here, the "PET" means polyethylene terephthalate. The mixture is desirably subjected to the same mixing treatment as the mixing treatment (for example, mixing treatment with a bead mill) performed in the process of preparing the catalyst layer-forming coating liquid.

When the catalyst layer is used in a solid polymer fuel cell, high output of the fuel cell is achieved while reducing an amount of catalyst used. The reason is not clear, but is presumed as follows.

The specific mesopore has a large pore surface area with respect to the pore capacity. Thus, the surface area of the carbon carrier having the specific mesopore is very large. For example, even when the carbon carrier is a carbon carrier in which a ratio of the total pore capacity of the specific mesopores to the total pore capacity of the entire mesopores and the entire macropores in the carbon carrier is about 30%, a ratio of the total pore surface area of the specific mesopores to the total pore surface area of the entire mesopores and the entire macropores in the carbon carrier may exceed 85%. That is, in the catalyst-supported carbon in which particles of the catalyst containing platinum are supported on a surface of the carbon carrier, although there is a catalyst supported on the surface other than the pores of the carbon carrier, the surface of the macropore, or the like, it is considered that a high proportion of catalyst is supported on the surface of the specific mesopores.

Thus, in order to bring the ionomer into contact with as much catalyst as possible, attempts have been made to bring the catalyst inside the pores into contact with the ionomer by allowing the ionomer to enter into the pores.

However, it has been found that when the ionomer comes into contact with platinum catalyst particles, the particles are poisoned by an acidic functional group of the ionomer, and catalytic activity of platinum may rather decrease.

Thus, in the catalyst layer of the present embodiment, the content of the ionomer with respect to 100 parts by mass of the carbon carrier is 100 parts by mass or more, and the ionomer occupancy rate is 50% by volume or less while at least a part of the ionomer exists in the specific mesopore. In the catalyst layer of the present embodiment, a periphery of the catalyst-supported carbon is surrounded by a sufficient amount of ionomer, and the amount of ionomer entering the inside of the specific mesopore is small. The ionomer that has surrounded the periphery of the catalyst-supported carbon and has not entered into the specific mesopore is in a state of being close to the catalyst carried inside the specific mesopore without being in contact with the catalyst. It is considered that the ionomer in the state of being close to the catalyst without being in contact with the catalyst forms a pseudo three-phase interface via water in a reaction gas (for example, hydrogen, oxygen, and the like used for battery operation) or water generated by a reaction. Accordingly, it is considered that the catalytic activity of platinum can be effectively utilized by forming the pseudo three-phase interface while suppressing the decrease in catalytic activity of platinum due to direct contact of the ionomer with platinum.

For the above reasons, it is presumed that in the catalyst layer of the present embodiment, high output of the fuel cell is achieved while reducing the amount of catalyst used.

Hereinafter, each component constituting the catalyst layer will be described.

<Catalyst-Supported Carbon>

The catalyst-supported carbon includes a carbon carrier having the specific mesopore, and a catalyst supported on the carbon carrier and containing platinum. Hereinafter, the carbon carrier and the catalyst will be described.

The carbon carrier is not particularly limited as long as it is carbon having at least the specific mesopore.

Examples of the carbon carrier include activated carbon and carbon black, and from the viewpoint of high chemical durability, a carbon carrier that is at least partially graphitized by heat treatment and the like is preferable. As the carbon carrier, mesoporous carbon in which a ratio of the total pore capacity occupied by the macropores is less than 40% with respect to the total pore capacity of the entire mesopores and the entire macropores is preferable from the viewpoint of suppressing the ionomer occupancy rate to a low level. The ratio of the total pore capacity occupied by the macropore is preferably from 5% to 35%, and more preferably from 10% to 30%.

The catalyst is not particularly limited as long as it contains platinum and promotes the oxidation-reduction reaction in the solid polymer fuel cell. The catalyst is preferably at least one selected from the group consisting of platinum and a platinum alloy, and more preferably contains at least one selected from the group consisting of platinum particles and platinum alloy particles.

The platinum alloy is preferably an alloy of platinum and at least one metal selected from the group consisting of gold, silver, chromium, iron, titanium, manganese, cobalt, nickel, molybdenum, tungsten, aluminum, silicon, zinc, tin, and a platinum group metal (ruthenium, rhodium, palladium, osmium, iridium) excluding platinum. The platinum alloy may contain an intermetallic compound of platinum and a metal alloyed with platinum.

When the catalyst contains at least one selected from the group consisting of platinum particles and platinum alloy particles, a number average particle diameter of the catalyst is, for example, in a range of 1 nm to 20 nm, and from the viewpoint of power generation performance and catalyst durability, the number average particle diameter is preferably in a range of 2 nm to 10 nm, and more preferably in a range of 2 nm to 7 nm.

The number average particle diameter of the catalyst is a value obtained by number-averaging equivalent circle diameters obtained for 300 to 400 particles in an image observed at a magnification of 300,000 using a transmission electron microscope (TEM) HT 7700 manufactured by Hitachi High-Technologies Corporation.

A method of supporting the catalyst on the carbon carrier is not particularly limited, and a known method such as a sputtering method, a solution method, an electrolytic deposition method, or an electroless plating method is used.

The content ratio of the catalyst with respect to the entire catalyst-supported carbon is, for example, in a range of 10% by mass to 70% by mass, and is preferably in a range of 20% by mass to 60% by mass, and more preferably in a range of 30% by mass to 60% by mass, from the viewpoint of achieving both the reduction in the amount of the catalyst used and high output.

The content of the catalyst per unit area of the catalyst layer is preferably from 0.01 mg/cm$^2$ to 0.50 mg/cm$^2$ from the viewpoint of an optimum thickness of the catalyst layer for efficiently performing an electrode reaction, and more preferably from 0.05 mg/cm$^2$ to 0.35 mg/cm$^2$ from the viewpoint of a balance between the cost and performance of the raw material. In particular, in the catalyst layer of the present embodiment, since the output can be increased while reducing the amount of catalyst used, the content of the catalyst per unit area of the catalyst layer may be 0.20 mg/cm$^2$ or less.

The specific surface area of the entire catalyst-supported carbon is preferably in a range of 200 m$^2$/g catalyst or more, and more preferably in a range of 250 m$^2$/g catalyst or more, for example, from the viewpoint of achieving both the reduction in the amount of catalyst used and high output. The specific surface area of the entire catalyst-supported carbon means a total surface area of the catalyst-supported carbon per unit mass in a state in which no ionomer is attached.

The specific surface area of the entire catalyst-supported carbon may be 700 m$^2$/g catalyst or less, 500 m$^2$/g catalyst or less, or 350 m$^2$/g catalyst or less.

The specific surface area of the entire catalyst-supported carbon is measured by nitrogen adsorption to a carbon surface using a BET specific surface area device.

The specific surface area of the mesopore in the catalyst-supported carbon is preferably in the range of 200 m$^2$/g catalyst or more, and more preferably in the range of 250 m$^2$/g catalyst or more, for example, from the viewpoint of achieving both the reduction in the amount of catalyst used and high output. The specific surface area of the mesopore in the catalyst-supported carbon means the total pore surface area of the mesopore in the catalyst-supported carbon per unit mass in the state in which no ionomer is attached. The specific surface area of the entire catalyst-supported carbon may be 700 m$^2$/g catalyst or less, 500 m$^2$/g catalyst or less, or 350 m$^2$/g catalyst or less.

The specific surface area of the specific mesopore in the catalyst-supported carbon is more preferably in the range of 200 m²/g catalyst or more, for example, from the viewpoint of achieving both the reduction in the amount of catalyst used and high output. The specific surface area of the specific mesopore in the catalyst-supported carbon means the total pore surface area of the specific mesopore in the catalyst-supported carbon per unit mass in the state in which no ionomer is attached.

The total pore capacity of the specific mesopores in the catalyst-supported carbon per unit mass in the state in which no ionomer is attached is, for example, in a range of 0.1 cm³/g catalyst to 0.8 cm³/g catalyst, and from the viewpoint of gas diffusibility and the power generation performance, the total pore capacity is preferably in a range of 0.15 cm³/g catalyst to 0.7 cm³/g catalyst, and more preferably in a range of 0.2 cm³/g catalyst to 0.6 cm³/g catalyst.

The ratio of the total pore capacity of the specific mesopores to the total pore capacity of the entire mesopores and the entire macropores in the catalyst-supported carbon in the state in which no ionomer is attached is, for example, in a range of 20% to 90%, and is preferably in a range of 25% to 80%, and more preferably in a range of 30% to 70% from the viewpoint of drainage properties of generated water and the power generation performance.

The total pore capacity of the macro pores in the catalyst-supported carbon per unit mass in the state in which no ionomer is attached is, for example, in a range of 0.05 cm³/g catalyst or more, and is preferably in a range of 0.07 cm³/g catalyst to 0.50 cm³/g catalyst, and more preferably in a range of 0.1 cm³/g catalyst to 0.4 cm³/g catalyst, from the viewpoint of achieving both the reduction in the amount of catalyst used and high output.

<Ionomer>

The ionomer is not particularly limited as long as it is a polymer compound having an ion-exchange group, and among them, a polymer compound having proton conductivity is preferable. Hereinafter, the polymer compound having an ion-exchange group is also referred to as an "ion-exchange resin". The "ion-exchange group" means a group having H⁺, a monovalent metal cation, an ammonium ion, and the like.

Examples of the ion-exchange group include a sulfonic acid group, a sulfonimide group, a sulfonamide group, a sulfonmethide group, a carboxyl group, and a phosphoric acid group, and among them, a sulfonic acid group having excellent proton conductivity is preferable. The ion-exchange group is used singly or in combination of two or more kinds thereof.

As the ionomer, a fluorine-containing ion exchange resin is preferable from the viewpoint of durability, and a perfluorocarbon polymer having an ion-exchange group is more preferable. The perfluorocarbon polymer may contain an etheric oxygen atom.

Examples of the perfluorocarbon polymer include known polymers such as a polymer (H) described later, a polymer (Q) described later, and a polymer having a constituent unit derived from a perfluoro monomer having an ion-exchange group and a 5-membered ring described in WO 2011/013577 A and the like. The ionomer preferably contains at least one selected from the group consisting of the polymer (H) and the polymer (Q) from the viewpoint of availability and ease of production.

A "polymer" means a compound having a structure constituted by a plurality of constituent units. A "constituent unit" means a unit derived from a monomer formed by polymerization of the monomer. A constituent unit may be a unit formed directly by the polymerization of the monomer or may be a unit having a part of the unit converted to another structure by treating the polymer. A "monomer" means a compound having a polymerizable carbon-carbon double bond.

Polymer (H):

The polymer (H) is a polymer having the following unit (U1) (excluding the polymer (Q)).

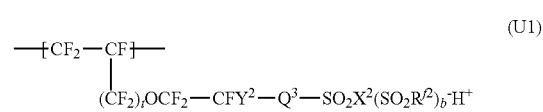

In the above unit (U1), $Q^3$ is a single bond or a perfluoroalkylene group which may have an etheric oxygen atom, $R^{f2}$ is a perfluoroalkyl group which may have an etheric oxygen atom, $X^2$ is an oxygen atom, a nitrogen atom, or a carbon atom, b is 0 when $X^2$ is an oxygen atom, 1 when $X^2$ is a nitrogen atom, 2 when $X^2$ is a carbon atom, $Y^2$ is a fluorine atom or a monovalent perfluoroorganic group, and t is 0 or 1. The single bond means direct binding of the carbon atom of $CFY^2$ and the sulfur atom of $SO_2$. The organic group means a group having one or more carbon atoms.

When the perfluoroalkylene group represented by $Q^3$ in the unit (U1) has an etheric oxygen atom, the number of such oxygen atom may be one or may be two or more. Such an oxygen atom may be inserted in the carbon atom/carbon atom bond of the perfluoroalkylene group or may be inserted at the terminal of the carbon atom bond.

The perfluoroalkylene group may be linear or branched.

The number of carbon atoms in the perfluoroalkylene group is preferably from 1 to 6, more preferably from 1 to 4.

The perfluoroalkyl group represented by $R^{f2}$ in the unit (U1) may be linear or branched, and is preferably linear.

The number of carbon atoms in the perfluoroalkyl group is preferably from 1 to 6, more preferably from 1 to 4. The perfluoroalkyl group is preferably a perfluoromethyl group, a perfluoroethyl group, or the like.

In the unit (U1), a $-(SO_2X^2(SO_2R^{f2})_b)^-H^+$ group is an ion-exchange group.

Examples of the $-(SO_2X^2(SO_2R^{f2})_b)^-H^+$ group in the unit (U1) include a sulfonic acid group ($-SO_3^-H^+$ group), a sulfonimide group ($-SO_2N(SO_2R^{f2})^-H^+$ group), and a sulfonmethide group ($-SO_2C(SO_2R^{f2})_2)^-H^+$ group).

$Y^2$ in the unit (U1) is preferably a fluorine atom or a trifluoromethyl group.

As the unit (U1), the following unit (U1-1) is preferable, and since the polymer (H) is easily produced and industrial application is easy, the following unit (U1-11), unit (U1-12), unit (U1-13), or unit (U1-14) is more preferable.

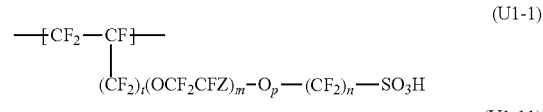

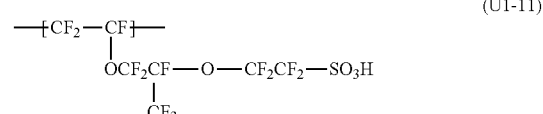

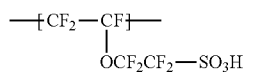
(U1-12)

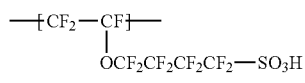
(U1-13)

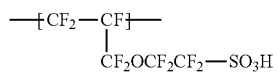
(U1-14)

However, in the unit (U1-1), Z is a fluorine atom or a trifluoromethyl group, t is 0 or 1, m is an integer of 0 to 3, n is an integer of 1 to 12, p is 0 or 1, and m+p>0.

The polymer (H) may further have a constituent unit derived from another monomer (hereinafter, the constituent unit is referred to as an "other unit"). The proportion of the other unit may be properly adjusted so that the ion exchange capacity of the polymer (H) is within a preferred range described hereinafter.

The other unit is preferably a constituent unit derived from a perfluoro monomer, more preferably a constituent unit derived from tetrafluoroethylene (hereinafter referred to as TFE), from the view point of mechanical strength and the chemical durability.

The polymer (H) can be produced by polymerizing the following compound (M1) and, if necessary, other monomers to obtain a precursor polymer, and then converting an —SO$_2$F group in the precursor polymer into a sulfonic acid group. The conversion of the —SO$_2$F group into the sulfonic acid group is performed by hydrolysis and an acidification treatment.

$$CF_2=CF-(CF_2)_tOCF_2-CFY^2-Q^3-SO_2F \quad (M1).$$

t, $Y^2$, and $Q^3$ in the compound (M1) have the same meanings as t, $Y^2$, and $Q^3$ in the unit (U1), respectively.

Polymer (Q):

The polymer (Q) is a polymer having at least one of the following units (U2) or (U3).

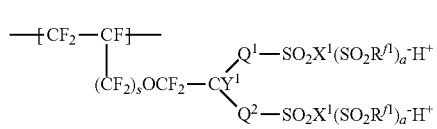
(U2)

In the above unit (U2), $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, $X^1$ is an oxygen atom, a nitrogen atom, or a carbon atom, a is 0 when $X^1$ is an oxygen atom, 1 when $X^1$ is a nitrogen atom, 2 when $X^1$ is a carbon atom, $Y^1$ is a fluorine atom or a monovalent perfluoroorganic group, and s is 0 or 1. The single bond means direct binding of the carbon atom of $CY^1$ and the sulfur atom of SO$_2$. The organic group means a group having one or more carbon atoms.

When the perfluoroalkylene group of $Q^1$ or $Q^2$ in the unit (U2) has an etheric oxygen atom, the number of such oxygen atom may be one or may be two or more. Such an oxygen atom may be inserted in the carbon atom/carbon atom bond of the perfluoroalkylene group or may be inserted at the terminal of the carbon atom bond.

The perfluoroalkylene group may be linear or branched, and is preferably linear.

The number of carbon atoms in the perfluoroalkylene group is preferably from 1 to 6, more preferably from 1 to 4. When the number of carbon atoms is 6 or less, a boiling point of a fluorine-containing monomer of the raw material becomes low, and purification by distillation is facilitated.

$Q^2$ in the unit (U2) is preferably a perfluoroalkylene group having 1 to 6 carbon atoms which may have an etheric oxygen atom. When $Q^2$ is a perfluoroalkylene group having 1 to 6 carbon atoms which may have an etheric oxygen atom, excellent stability of the power generation performance is obtained when a solid polymer fuel cell is operated for a long period of time, as compared with a case in which $Q^2$ is a single bond.

At least one of $Q^1$ or $Q^2$ in the unit (U2) is preferably a perfluoroalkylene group having 1 to 6 carbon atoms having an etheric oxygen atom. Since the fluorine-containing monomer having a perfluoroalkylene group having 1 to 6 carbon atoms having an etheric oxygen atom can be synthesized without a fluorination reaction by a fluorine gas, and accordingly the fluorine-containing monomer can be produced easily with a favorable yield.

The perfluoroalkyl group of $R^{f1}$ in the unit (U2) may be linear or branched, and is preferably linear.

The number of carbon atoms in the perfluoroalkyl group is preferably from 1 to 6, more preferably from 1 to 4. The perfluoroalkyl group is preferably a perfluoromethyl group, a perfluoroethyl group, or the like.

When the unit (U2) has two or more $R^{f1}$, the $R^{f1}$ may be the same group or may be different groups.

In the unit (U2), a —(SO$_2$X$^1$(SO$_2$R$^{f1}$)$_a$)$^-$H$^+$ group is an ion-exchange group.

Examples of the —(SO$_2$X$^1$(SO$_2$R$^{f1}$)$_a$)$^-$H$^+$ group in the unit (U2) include a sulfonic acid group (—SO$_3$$^-$H$^+$ group), a sulfonimide group (—SO$_2$N(SO$_2$R$^{f1}$)$^-$H$^+$ group), and a sulfonmethide group (—SO$_2$C(SO$_2$R$^{f1}$)$_2$)$^-$H$^+$ group).

$Y^1$ in the unit (U2) is preferably a fluorine atom or a linear perfluoroalkyl group having 1 to 6 carbon atoms which may have an etheric oxygen atom.

As the unit (U2), the following unit (U2-1) is preferable, and since the polymer (Q) is easily produced and industrial application is easy, the following units (U2-11), unit (U2-12), or unit (U2-13) is more preferable.

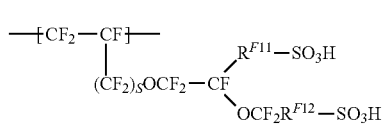
(U2-1)

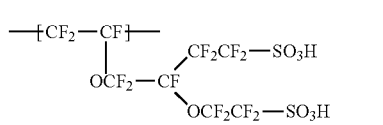
(U2-11)

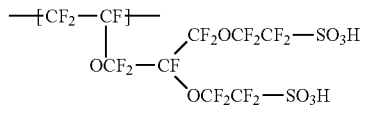
(U2-12)

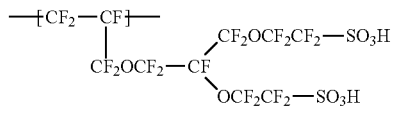
(U2-13)

However, in the above unit (U2-1), $R^{F11}$ is a single bond or a linear perfluoroalkyl group having 1 to 6 carbon atoms which may have an etheric oxygen atom, $R^{F12}$ is a linear perfluoroalkylene group having 1 to 6 carbon atoms, and s is 0 or 1.

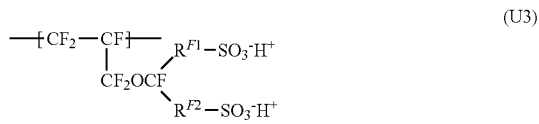

(U3)

However, in the above unit (U3), $R^{F1}$ and $R^{F2}$ are each independently a perfluoroalkylene group having 1 to 3 carbon atoms.

Specific examples of $R^{F1}$ and $R^{F2}$ include —$CF_2$—, —$CF_2CF_2$—, —$CF(CF_3)$—, —$CF_2CF_2CF_2$—, —$CF(CF_2CF_3)$—, —$CF(CF_3)CF_2$—, —$CF_2CF(CF_3)$—, and —$C(CF_3)(CF_3)$—.

$R^{F1}$ and $R^{F2}$ are each independently preferably a perfluoroalkylene group having 1 or 2 carbon atoms from the viewpoint that the raw material is inexpensive, the production is easy, and the ion exchange capacity of the polymer (Q) can be further increased. In the case of 2 carbon atoms, a linear chain is preferable. Specifically, —$CF_2$—, —$CF_2CF_2$—, or —$CF(CF_3)$— is preferable, —$CF_2$— or —$CF_2CF_2$— is more preferable, and —$CF_2$— is particularly preferable.

The unit (U3) is preferably the following unit (U3-1).

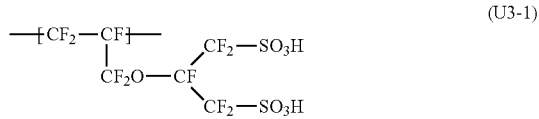

(U3-1)

The polymer (Q) may further have another unit. The proportion of the other unit may be properly adjusted so that the ion exchange capacity of the polymer (Q) is within a preferred range described hereinafter.

The other unit is preferably a constituent unit derived from a perfluoro monomer, more preferably a constituent unit derived from TFE, from the view point of the mechanical strength and the chemical durability.

The polymer (Q) can be produced, for example, by a method described in WO 2007/013533 A, WO 2020/116651 A, or the like.

The ion exchange capacity of the ionomer is preferably from 0.5 milli-equivalent/g dry resin to 2.0 milli-equivalent/g dry resin, and particularly preferably from 0.8 milli-equivalent/g dry resin to 1.5 milli-equivalent/g dry resin, from the viewpoint of conductivity and gas permeability.

The content of the ionomer with respect to 100 parts by mass of the carbon carrier is 100 parts by mass or more, and is preferably from 100 parts by mass to 240 parts by mass, more preferably from 110 parts by mass to 200 parts by mass, and still more preferably from 120 parts by mass to 180 parts by mass, from the viewpoint of achieving both the reduction in the amount of catalyst used and high output.

<Properties of Catalyst Layer>

The ionomer occupancy rate is 50% by volume or less, and is preferably from 10% by volume to 50% by volume from the viewpoint of achieving both the reduction in the amount of catalyst used and high output. The ionomer occupancy rate is more preferably from 15% by volume to 40% by volume, still more preferably from 20% by volume to 35% by volume from the viewpoint of further achieving both the reduction in the amount of catalyst used and high output under a low humidity environment (for example, an environment with a humidity of 30%).

Examples of a method of reducing the ionomer occupancy rate while increasing the ionomer content include a method of adjusting the mixing treatment conditions performed in the process of preparing the catalyst layer-forming coating liquid, and a method of adjusting properties of a material used for preparing the catalyst layer-forming coating liquid, and these methods may be used in combination.

Examples of the method of adjusting the mixing treatment conditions include a method of suppressing shearing stress applied in the mixing treatment to be small, and a method of shortening the treatment time of the mixing treatment.

Examples of the method of adjusting the properties of the material include a method using a viscosity-increasing ionomer (for example, an ionomer whose viscosity is increased by adding a fluorine-based solvent), a method using an ionomer having a large molecular weight, and a method using a hydrophilizing catalyst-supported carbon (for example, catalyst-supported carbon in which an amount of hydrophilic functional groups on the surface is increased by acid treatment).

The catalyst-supported carbon in the catalyst layer preferably has 0.03 $cm^3$/g catalyst or more of a macropore having a pore diameter of 50 nm or more, in the pore distribution obtained by the nitrogen adsorption method, in the state in which the ionomer is attached.

The total pore capacity of the macropores in the catalyst-supported carbon per unit mass in the state in which the ionomer is attached is, for example, in a range of 0.03 $cm^3$/g catalyst to 0.3 $cm^3$/g catalyst, and is preferably in a range of 0.05 $cm^3$/g catalyst to 0.25 $cm^3$/g catalyst, and more preferably in a range of 0.07 $cm^3$/g catalyst to 0.20 $cm^3$/g catalyst, from the viewpoint of achieving both the reduction in the amount of catalyst used and high output.

The thickness of the catalyst layer is not particularly limited, and is, for example, in a range of 0.5 μm to 10 μm, and is preferably in a range of 1 μm to 8 μm, and more preferably a range of 2 μm to 6 μm.

The thickness of the catalyst layer is measured by observing a cross section of the catalyst layer with a scanning electron microscope or the like.

<Method of Producing Catalyst Layer>

A method of producing a catalyst layer includes, for example, a preparation step of preparing a catalyst layer-forming coating liquid, and a catalyst layer forming step of forming a catalyst layer by applying the catalyst layer-forming coating liquid to a surface of a layer (gas diffusion layer, polymer electrolyte membrane, etc.) in contact with the catalyst layer in a membrane electrode assembly or a surface of a substrate film and drying the coating liquid.

When the catalyst layer-forming coating liquid is applied to the surface of the substrate film, a transfer step of transferring the formed catalyst layer to the surface of the layer in contact with the catalyst layer in the membrane electrode assembly may be further performed.

In the preparation step, for example, a catalyst layer-forming coating liquid is prepared by mixing a catalyst-supported carbon, an ionomer, and, if necessary, a solvent. Each of the catalyst-supported carbon and the ionomer may be dispersed in a solvent in advance. That is, a dispersion liquid in which the catalyst-supported carbon is dispersed and a dispersion liquid in which the ionomer is dispersed may be mixed.

Examples of the solvent include aqueous solvents such as water, alcohol, and mixtures thereof, and organic solvents, and among these solvents, an aqueous solvent is preferable from the viewpoint of safety during coating and drying.

The mixing method is not particularly limited, and examples of the method include known mixing methods such as mixing by a bead mill, mixing by a ball mill, mixing by an ultrasonic disperser, and a jet mill, and among these methods, a mixing method by a bead mill is preferable from the viewpoint of reducing an ionomer content ratio.

A solid content concentration of the catalyst layer-forming coating liquid is not particularly limited, and is, for example, in a range of 5% by mass to 30% by mass.

Examples of the substrate film used in the catalyst layer forming step include an ETFE film and an olefin-based resin film in addition to a PET film. The "ETFE" means a tetrafluoroethylene-ethylene copolymer resin.

The method of applying the catalyst layer-forming coating liquid is not particularly limited, and examples the method include a known method such as a die coating method.

As a method of drying a layer of the applied catalyst layer-forming coating liquid, a known method is used. Examples of the drying temperature include a range of 40° C. to 130° C., and a range of 45° C. to 80° C. is preferable. Examples of the drying time include a range of 0.5 minutes to 10 minutes, and a range of 1 minute to 7 minutes is preferable.

[Membrane Electrode Assembly for Solid Polymer Fuel Cell]

A membrane electrode assembly for a solid polymer fuel cell (hereinafter, also referred to as the "membrane electrode assembly") according to the present embodiment includes an anode including a first gas diffusion layer and a first catalyst layer provided at one surface side of the first gas diffusion layer, a cathode including a second gas diffusion layer and a second catalyst layer provided at one surface side of the second gas diffusion layer, and a polymer electrolyte membrane disposed between the first catalyst layer and the second catalyst layer, in which at least one of the first catalyst layer or the second catalyst layer is the catalyst layer described above.

Hereinafter, the membrane electrode assembly according to the present embodiment will be described with reference to the drawings.

FIG. 1 shows a schematic cross-sectional view in an example of a mode in which the above-described catalyst layer is used as the second catalyst layer which is the catalyst layer of the cathode in the membrane electrode assembly of the present embodiment.

The membrane electrode assembly 10 shown in FIG. 1 includes an anode 13 having a catalyst layer 11 and a gas diffusion layer 12, a cathode 14 having a catalyst layer 21 and a gas diffusion layer 22, and a polymer electrolyte membrane 15 disposed between the anode 13 and the cathode 14 in a state of being in contact with the catalyst layer 11 and a catalyst layer 21.

The catalyst layer 21 is the above-described catalyst layer.

The catalyst layer 21 and the catalyst layer 11 may be layers having the same component, composition, thickness, and the like, or may be layers different from each other.

Examples of the catalyst layer 11 include a layer containing a catalyst-supported carbon and an ionomer. The catalyst layer 11 may be the catalyst layer according to the above-described embodiment, or may be a catalyst layer other than the catalyst layer according to the above-described embodiment. As the catalyst-supported carbon and the ionomer in the catalyst layer 11, those similar to the catalyst-supported carbon and the ionomer in the catalyst layer according to the above-described embodiment may be used.

The gas diffusion layer 12 and the gas diffusion layer 22 have a function of uniformly diffusing gas into the catalyst layer 11 and the catalyst layer 21, respectively, and a function as a current collector. Each of the gas diffusion layer 12 and the gas diffusion layer 22 is formed of, for example, a gas diffusive substrate. Examples of the gas diffusion layer 12 and the gas diffusion layer 22 include carbon paper, carbon cloth, and carbon felt. The gas diffusion layer 12 and the gas diffusion layer 22 are preferably subjected to a water repellent treatment using polytetrafluoroethylene or the like. The gas diffusion layer 12 and the gas diffusion layer 22 may be layers having the same component, composition, thickness, and the like, or may be layers different from each other.

The anode 13 may have a carbon layer (not shown) as an intermediate layer between the catalyst layer 11 and the gas diffusion layer 12. The cathode 14 may similarly have a carbon layer (not shown) as an intermediate layer between the catalyst layer 21 and the gas diffusion layer 22. When the carbon layer is provided, the gas diffusibility of a surface of the catalyst layer is improved, and the power generation performance of the solid polymer fuel cell is greatly improved.

Examples of the carbon layer include a layer containing carbon and a nonionic fluorine-containing polymer. Examples of carbon used for the carbon layer include carbon nanofibers having a fiber diameter of 1 nm to 1000 nm and a fiber length of 1000 μm or less. Examples of the nonionic fluorine-containing polymer include polytetrafluoroethylene.

The polymer electrolyte membrane 15 is a membrane containing an ion exchange resin. As the ion exchange resin, from the viewpoint of durability, a fluorine-containing ion exchange resin is preferable, a perfluorocarbon polymer having an ion exchange group is more preferable, the above-described polymer (H) or polymer (Q) is still more preferable, and the polymer (H) is particularly preferable. The perfluorocarbon polymer may contain an etheric oxygen atom.

The ion exchange capacity of the fluorine-containing ion exchange resin is preferably from 0.5 milli-equivalent/g dry resin to 2.0 milli-equivalent/g dry resin, and particularly preferably from 0.8 milli-equivalent/g dry resin to 1.5 milli-equivalent/g dry resin.

The ion exchange capacity of the fluorine-containing ion exchange resin can be measured by the same method as the ion exchange capacity of the ionomer.

The polymer electrolyte membrane 15 may be reinforced with a reinforcing material. Examples of the reinforcing material include a porous body, a fiber, a woven fabric, and a nonwoven fabric. Examples of the material of the reinforcing material include polytetrafluoroethylene, a tetrafluoroethylene-hexafluoropropylene copolymer, a tetrafluoroethylene-perfluoro (alkyl vinyl ether) copolymer, polyethylene, polypropylene, and polyphenylene sulfide.

The polymer electrolyte membrane 15 may contain one or more atoms selected from the group consisting of cerium and manganese in order to further improve durability. Cerium and manganese decompose hydrogen peroxide which is a substance to cause deterioration of the polymer electrolyte membrane 15. Cerium and manganese are preferably present as ions in the polymer electrolyte membrane 15.

The polymer electrolyte membrane 15 may contain silica, a heteropolyacid (such as zirconium phosphate, phosphomolybdic acid or phosphotungustic acid), or the like as a water retention agent to prevent drying.

The thickness of the polymer electrolyte membrane is preferably 10 µm to 30 µm, and more preferably 15 µm to 25 µm. When the thickness of the polymer electrolyte membrane is equal to or less than the upper limit value of the above range, deterioration of the power generation performance of the solid polymer fuel cell under a low humidification condition is suppressed. When the thickness of the polymer electrolyte membrane is equal to or more than the lower limit value of the above range, gas leakage and electrical short circuit can be suppressed.

The thickness of the polymer electrolyte membrane is measured by observing a cross section of the polymer electrolyte membrane with a scanning electron microscope or the like.

<Method of Producing Membrane Electrode Assembly>

The membrane electrode assembly 10 is produced, for example, by the following method.

(α) A method of forming the catalyst layer 11 and the catalyst layer 21 on the polymer electrolyte membrane 15 to form a membrane catalyst layer assembly, and sandwiching the membrane catalyst layer assembly between the gas diffusion layer 12 and the gas diffusion layer 22.

(β) A method of forming the catalyst layer 11 on the gas diffusion layer 12 to serve as the anode 13, forming the catalyst layer 21 on the gas diffusion layer 22 to serve as the cathode 14, and sandwiching the polymer electrolyte membrane 15 between the anode 13 and the cathode 14.

When the membrane electrode assembly 10 has the carbon layer, the membrane electrode assembly 10 is produced by, for example, the following method.

(γ) A method in which a dispersion liquid containing carbon and a nonionic fluorine-containing polymer is applied onto a substrate film, and dried to form a carbon layer, the catalyst layer 11 is formed on the carbon layer, a laminated body in which the carbon layer and the catalyst layer 21 are formed in this order on the substrate film is separately prepared by the same method, the catalyst layer 11 and the polymer electrolyte membrane 15, and the catalyst layer 21 and the polymer electrolyte membrane 15 are bonded to each other, each substrate film is peeled off to obtain a membrane catalyst layer assembly having a carbon layer, and the membrane catalyst layer assembly is sandwiched between the gas diffusion layer 12 and the gas diffusion layer 22.

(δ) A method in which a dispersion liquid containing carbon and a nonionic fluorine-containing polymer is applied onto the gas diffusion layer 12 and the gas diffusion layer 22, respectively, and dried to form a carbon layer, and a membrane catalyst layer assembly in which the catalyst layer 11 and the catalyst layer 21 are formed on the polymer electrolyte membrane 15 is sandwiched between the gas diffusion layer 12 having a carbon layer and the gas diffusion layer 22 having a carbon layer.

The polymer electrolyte membrane 15 can be formed by, for example, a method (cast method) in which a liquid composition containing an ion exchange resin is applied onto a substrate film or a catalyst layer (the catalyst layer 11 or the catalyst layer 21) and dried.

When the polymer electrolyte membrane 15 is formed, for example, a liquid composition containing a liquid medium, a fluorine-containing polymer having a sulfonic acid group, and trivalent or tetravalent cerium ions may be used.

When the liquid composition is used, heat treatment is preferably performed in order to stabilize the polymer electrolyte membrane 15. The temperature of the heat treatment depends on the type of the ion exchange resin, and is preferably 130° C. to 200° C. When the temperature of the heat treatment is 130° C. or higher, the ion exchange resin does not excessively contain water. When the temperature of the heat treatment is 200° C. or lower, thermal decomposition of sulfonic acid groups is suppressed, and a decrease in proton conductivity of the polymer electrolyte membrane 15 is suppressed. The polymer electrolyte membrane 15 may be treated with hydrogen peroxide water as necessary.

[Solid Polymer Fuel Cell]

The solid polymer fuel cell according to the present embodiment includes the above-described membrane electrode assembly.

The solid polymer fuel cell is manufactured, for example, by sandwiching the membrane electrode assembly between two separators to form a cell and stacking a plurality of the cells.

Examples of the separator include an electrically conductive carbon plate having grooves formed to constitute flow paths for a fuel gas or an oxidant gas containing oxygen (such as air or oxygen).

Examples of the type of the solid polymer fuel cell include a hydrogen/oxygen type fuel cell and direct methanol type fuel cell (DMFC). Methanol or a methanol aqueous solution to be used as a fuel for DMFC may be a liquid feed or a gas feed.

EXAMPLES

Hereinafter, the present disclosure will be described in detail with reference to Examples and Reference Examples. However, the present disclosure is not limited to the following Examples.

[Catalyst-Supported Carbon]

As the catalyst-supported carbons, the following catalyst-supported carbon (1), catalyst-supported carbon (2), and catalyst-supported carbon (3) were prepared.

Catalyst-supported carbon (1): catalyst: platinum particles, catalyst content ratio with respect to the entire catalyst-supported carbon: 60% by mass, number average particle diameter of platinum particles: 4.8 nm Catalyst-supported carbon (2): catalyst: platinum particles, catalyst content ratio with respect to the entire catalyst-supported carbon: 50% by mass, number average particle diameter of platinum particles: 3.3 nm Catalyst-supported carbon (3): catalyst: platinum particles, catalyst content ratio with respect to the entire catalyst-supported carbon: 20% by mass, number average particle diameter of platinum particles: 2.5 nm As the catalyst-supported carbon (3), a general platinum-supported carbon catalyst having a platinum supporting rate of 20% was used.

The properties of the catalyst-supported carbon (1) are as follows.

Total specific surface area: 283 m$^2$/g catalyst

Total pore capacity of specific mesopores: 0.15 cm$^3$/g catalyst

Ratio of total pore capacity of specific mesopores to entire mesopores and entire macropores: 28%

Total pore capacity of macropores: 0.25 cm$^3$/g catalyst

The properties of the catalyst-supported carbon (2) are as follows.

Total specific surface area: 410 m$^2$/g catalyst

Total pore capacity of specific mesopores: 0.15 cm³/g catalyst

Ratio of total pore capacity of specific mesopores to entire mesopores and entire macropores: 50%

Total pore capacity of macropores: 0.25 cm³/g catalyst

[Ionomer Dispersion Liquid]

As the ionomer, a polymer (H1) (ion exchange capacity: 1.1 milli-equivalent/g dry resin) having a constituent unit derived from TFE and the unit (U1-11) was prepared.

The polymer (H1) was dispersed in a dispersion medium of ethanol/water=6/4 (mass ratio) to prepare a polymer (H1) dispersion liquid (A) having a solid content concentration of 25.0% by mass.

[Preparation of Catalyst Layer-Forming Coating Liquid]

<Coating Liquid (a1)>

50.0 g of catalyst-supported carbon (1) was added to 363 g of distilled water and stirred thoroughly. In addition, 177 g of ethanol and 65 g of 2-propanol were added, and the resulting mixture was stirred thoroughly. 56.0 g of the polymer (H1) dispersion liquid (A) was added thereto, and using a bead mill (LZ015 manufactured by Ashizawa Finetech Ltd.) and zirconia beads of 1 mm, dispersion was performed at a peripheral speed of 6 m/s and a retention time of 1.1 minutes, and this was used as a coating liquid (a1).

<Coating Liquid (a2)>

50.0 g of catalyst-supported carbon (1) was added to 389 g of distilled water and stirred thoroughly. In addition, 188 g of ethanol and 71 g of 2-propanol were added, and the resulting mixture was stirred thoroughly. 80.0 g of the polymer (H1) dispersion liquid (A) was added thereto, and using a bead mill (LZ015 manufactured by Ashizawa Finetech Ltd.) and zirconia beads of 1 mm, dispersion was performed at a peripheral speed of 6 m/s and a retention time of 1.1 minutes, and this was used as a coating liquid (a2).

<Coating Liquid (a3)>50.0 g of catalyst-supported carbon (1) was added to 431 g of distilled water and stirred thoroughly. In addition, 207 g of ethanol and 81 g of 2-propanol were added, and the resulting mixture was stirred thoroughly. 120 g of the polymer (H1) dispersion liquid (A) was added thereto, and using a bead mill (LZ015 manufactured by Ashizawa Finetech Ltd.) and zirconia beads of 1 mm, dispersion was performed at a peripheral speed of 6 m/s and a retention time of 1.1 minutes, and this was used as a coating liquid (a3).

<Coating Liquid (a4)>

50.0 g of catalyst-supported carbon (1) was added to 363 g of distilled water and stirred thoroughly. In addition, 177 g of ethanol and 65 g of 2-propanol were added, and the resulting mixture was stirred thoroughly. 56.0 g of the polymer (H1) dispersion liquid (A) was added thereto, and using a bead mill (LZ015 manufactured by Ashizawa Finetech Ltd.) and zirconia beads of 0.5 mm, dispersion was performed at a peripheral speed of 8 m/s and a retention time of 5.5 minutes, and this was used as a coating liquid (a4).

<Coating Liquid (a5)>

50.0 g of catalyst-supported carbon (1) was added to 389 g of distilled water and stirred thoroughly. In addition, 188 g of ethanol and 71 g of 2-propanol were added, and the resulting mixture was stirred thoroughly. 80.0 g of the polymer (H1) dispersion liquid (A) was added thereto, and using a bead mill (LZ015 manufactured by Ashizawa Finetech Ltd.) and zirconia beads of 0.5 mm, dispersion was performed at a peripheral speed of 8 m/s and a retention time of 5.5 minutes, and this was used as a coating liquid (a5).

<Coating Liquid (a6)>

50.0 g of catalyst-supported carbon (1) was added to 431 g of distilled water and stirred thoroughly. In addition, 207 g of ethanol and 81 g of 2-propanol were added, and the resulting mixture was stirred thoroughly. 120 g of the polymer (H1) dispersion liquid (A) was added thereto, and using a bead mill (LZ015 manufactured by Ashizawa Finetech Ltd.) and zirconia beads of 0.5 mm, dispersion was performed at a peripheral speed of 8 m/s and a retention time of 5.5 minutes, and this was used as a coating liquid (a6).

<Coating Liquid (a7)>

50.0 g of catalyst-supported carbon (3) was added to 357 g of distilled water and stirred thoroughly. In addition, 376 g of ethanol was added, and stirred thoroughly. 128 g of the polymer (H1) dispersion liquid (A) was added thereto, and using a bead mill (LZ015 manufactured by Ashizawa Finetech Ltd.) and zirconia beads of 1.0 mm, dispersion was performed at a peripheral speed of 6 m/s and a retention time of 4.3 minutes, and this was used as a coating liquid (a7).

<Coating Liquid (a8)>

50.0 g of catalyst-supported carbon (2) was added to 375 g of distilled water and stirred thoroughly. In addition, 397 g of ethanol was added, and stirred thoroughly. 150 g of the polymer (H1) dispersion liquid (A) was added thereto, and using a bead mill (LZ015 manufactured by Ashizawa Finetech Ltd.) and zirconia beads of 1.0 mm, dispersion was performed at a peripheral speed of 6 m/s and a retention time of 1.1 minutes, and this was used as a coating liquid (a8).

[Preparation of Coating Liquid for Forming Intermediate Layer (Carbon Layer)]

<Coating Liquid (c1)>

21.0 g of ethanol and 24.0 g of distilled water were added to 10.0 g of vapor-grown carbon fiber (from Showadenkosya Co., Ltd., trade name: VGCF-H, average fiber diameter: about 150 nm, fiber length: 10 to 20 μm), and the mixture was stirred thoroughly. 20.0 g of the polymer (H1) dispersion liquid (A) was added thereto, stirred thoroughly, and further mixed and pulverized using a homogenizer, and this was used as a coating liquid (c1).

[Formation of Catalyst Layer]

Example C1

The coating liquid (c1) was applied by a die coater onto a gas diffusion layer base material (H2315 T10X6, manufactured by NOK Corporation) having no sealing layer so that a solid content was 3.0 mg/cm², dried, and further the coating liquid (a1) was applied thereon by a die coater so that the amount of platinum was 0.20 mg/cm², followed by drying to obtain a cathode (gc1). The "amount of platinum" means the content of the catalyst per unit area of the catalyst layer.

The coating liquid (a7) was applied onto a gas diffusion layer base material having a sealing layer (25BC, manufactured by SGL carbon Group) by a die coater so that the amount of platinum was 0.05 mg/cm², followed by drying to obtain an anode (ga1).

As a polymer electrolyte membrane, a 20 μm-thick ion exchange membrane (manufactured by Asahi Glass Company, Limited, tradename: Flemion, ion exchange capacity: 1.1 milli-equivalent/g dry resin) made of a perfluorocarbon polymer having sulfonic acid groups, was provided.

The polymer electrolyte membrane was sandwiched between the anode (ga1) and the cathode (gc1), and the catalyst layers of the anode (ga1) and the cathode (gc1) were pressure-bonded to the polymer electrolyte membrane by a hot press method to obtain a membrane electrode assembly (electrode area: 25 cm²).

Example 1

The coating liquid (c1) was applied by a die coater onto a gas diffusion layer base material (H2315 T10X6, manufactured by NOK Corporation) having no sealing layer so that a solid content was 3.0 mg/cm², dried, and further the coating liquid (a2) was applied thereon by a die coater so that the amount of platinum was 0.20 mg/cm², followed by drying to obtain a cathode (gc2).

A membrane electrode assembly was obtained in the same manner as in Example C1 except that the cathode (gc2) was used instead of the cathode (gc1).

Example 2

The coating liquid (c1) was applied by a die coater onto a gas diffusion layer base material (H2315 T10X6, manufactured by NOK Corporation) having no sealing layer so that a solid content was 3.0 mg/cm², dried, and further the coating liquid (a3) was applied thereon by a die coater so that the amount of platinum was 0.20 mg/cm², followed by drying to obtain a cathode (gc3).

A membrane electrode assembly was obtained in the same manner as in Example C1 except that the cathode (gc3) was used instead of the cathode (gc1).

Example C2

The coating liquid (c1) was applied by a die coater onto a gas diffusion layer base material (H2315 T10X6, manufactured by NOK Corporation) having no sealing layer so that a solid content was 3.0 mg/cm², dried, and further the coating liquid (a4) was applied thereon by a die coater so that the amount of platinum was 0.20 mg/cm², followed by drying to obtain a cathode (gc4).

A membrane electrode assembly was obtained in the same manner as in Example C1 except that the cathode (gc4) was used instead of the cathode (gc1).

Example 3

The coating liquid (c1) was applied by a die coater onto a gas diffusion layer base material (H2315 T10X6, manufactured by NOK Corporation) having no sealing layer so that a solid content was 3.0 mg/cm², dried, and further the coating liquid (a5) was applied thereon by a die coater so that the amount of platinum was 0.20 mg/cm², followed by drying to obtain a cathode (gc5).

A membrane electrode assembly was obtained in the same manner as in Example C1 except that the cathode (gc5) was used instead of the cathode (gc1).

Example C3

The coating liquid (c1) was applied by a die coater onto a gas diffusion layer base material (H2315 T10X6, manufactured by NOK Corporation) having no sealing layer so that a solid content was 3.0 mg/cm², dried, and further the coating liquid (a6) was applied thereon by a die coater so that the amount of platinum was 0.20 mg/cm², followed by drying to obtain a cathode (gc6).

A membrane electrode assembly was obtained in the same manner as in Example C1 except that the cathode (gc6) was used instead of the cathode (gc1).

Example 4

The coating liquid (c1) was applied by a die coater onto a gas diffusion layer base material (H2315 T10X6, manufactured by NOK Corporation) having no sealing layer so that a solid content was 3.0 mg/cm², dried, and further the coating liquid (a8) was applied thereon by a die coater so that the amount of platinum was 0.10 mg/cm², followed by drying to obtain a cathode (gc7).

A membrane electrode assembly was obtained in the same manner as in Example C1 except that the cathode (gc7) was used instead of the cathode (gc1).

[Measurement and Evaluation]

<Content of Ionomer with Respect to 100 Parts by Mass of Carbon Carrier>

The content (parts by mass) of the ionomer with respect to 100 parts by mass of the carbon carrier in the cathode of the above example is shown in Table 1 ("Ionomer content" in Table 1).

<Ionomer Occupancy Rate>

The coating liquid used for forming the cathode in the above example was applied onto a PET film and dried, and then a powder obtained by scraping off the coating layer was used as a "sample of the catalyst-supported carbon to which the ionomer was attached". A coating liquid containing no ionomer (that is, a mixed liquid of the catalyst-supported carbon and the solvent) was applied onto a PET film and dried, and then a powder obtained by scraping off the coating layer was used as the "sample of the catalyst-supported carbon to which no ionomer is attached". Using these samples, the pore distribution was determined by the above-described method, and the ionomer occupancy rate (%) in each example was calculated. The results are shown in Table 1.

<Macropore Pore Capacity after Attachment of Ionomer>

From the pore distribution of the "sample of the catalyst-supported carbon to which the ionomer was attached" in each example, the total pore capacity (cm³/g catalyst) of the macropores per unit mass of the catalyst-supported carbon in the state in which the ionomer was attached was determined. The results are shown in Table 1 ("Macropore pore capacity" in Table 1).

<Power Generation Performance (1)>

The membrane electrode assembly obtained in the above example was assembled into a power generation cell, and a cell voltage (V) at an initial stage of operation under atmospheric pressure at a cell temperature of 80° C. at a current density of 1.0 A/cm² by supplying hydrogen (utilization ratio 70%)/air (utilization ratio 50%) was measured. On the anode side, hydrogen with a dew point of 80° C. was supplied, and on the cathode side, air with a dew point of 80° C. was supplied, to the cell (relative humidity in the cell: 100% RH). The results are shown in Table 1 ("100% RH cell voltage" in Table 1).

<Power Generation Performance (2)>

The membrane electrode assembly obtained in the above example was assembled into a power generation cell, and the cell voltage (V) at the initial stage of operation under atmospheric pressure at a cell temperature of 80° C. at a current density of 1.0 A/cm² by supplying hydrogen (utilization ratio 70%)/air (utilization ratio 50%) was measured. On the anode side, hydrogen with a dew point of 53° C. was supplied, and on the cathode side, air with a dew point of 53° C. was supplied, to the cell (relative humidity in the cell: 30% RH). The results are shown in Table 1 ("30% RH cell voltage" in Table 1).

TABLE 1

| Example | C1 | 1 | 2 | C2 | 3 | C3 | 4 |
|---|---|---|---|---|---|---|---|
| Ionomer content (part(s) by mass) | 70 | 100 | 150 | 70 | 100 | 150 | 150 |
| Ionomer occupancy rate (%) | 24 | 31 | 33 | 38 | 47 | 52 | 25 |
| Macropore pore capacity (cm$^3$/g catalyst) | 0.236 | 0.208 | 0.148 | 0.203 | 0.181 | 0.124 | 0.07 |
| 100% RH cell voltage (V) | 0.605 | 0.627 | 0.634 | 0.588 | 0.617 | 0.574 | 0.630 |
| 30% RH cell voltage (V) | 0.577 | 0.602 | 0.606 | 0.543 | 0.587 | 0.551 | 0.602 |

As can be seen from the results shown in Table 1, in Examples 1 to 4, high output of the fuel cell is achieved while reducing the amount of catalyst used, as compared with Examples C1 to C3.

The disclosure of Japanese Patent Application No. 2019-232523, filed on Dec. 24, 2019, is incorporated herein by reference in its entirety.

All publications, patent applications, and technical standards mentioned in this description are incorporated herein to the same extent as if each individual publication, patent application, or technical standard was specifically and individually indicated to be incorporated by reference.

REFERENCE SIGNS LIST 10 membrane electrode assembly
11 catalyst layer
12 gas diffusion layer
13 anode
14 cathode
21 catalyst layer
22 gas diffusion layer

The invention claimed is:

1. A catalyst layer, comprising:
a catalyst-supported carbon comprising a catalyst comprising platinum supported on a carbon carrier; and
an ionomer, wherein:
the catalyst-supported carbon comprises mesopores having a pore diameter of from 2 nm to less than 10 nm in a pore distribution obtained by a nitrogen adsorption method,
at least a part of the ionomer exists in mesopores having a pore diameter of from 2 nm to less than 10 nm,
a content of the ionomer with respect to 100 parts by mass of the carbon carrier is 100 parts by mass or more, and
an occupancy rate of the ionomer in a total volume of the mesopores having a pore diameter of from 2 nm to less than 10 nm is 50% by volume or less.

2. The catalyst layer according to claim 1, wherein:
the catalyst-supported carbon has a content of macropores having a pore diameter of 50 nm or more of 0.03 cm$^3$/g or more; and
the content of macropores is determined from the pore distribution obtained by the nitrogen adsorption method, in a state in which the ionomer is attached to the catalyst-supported carbon.

3. The catalyst layer according to claim 1, wherein a content of the catalyst per unit area of the catalyst layer is 0.2 mg/cm$^2$ or less.

4. The catalyst layer according to claim 1, wherein the catalyst comprises at least one selected from the group consisting of platinum particles and platinum alloy particles.

5. The catalyst layer according to claim 4, wherein the catalyst has a number average particle diameter of 1 nm to 20 nm.

6. The catalyst layer according to claim 1, wherein a content ratio of the catalyst with respect to the entire catalyst-supported carbon is from 10% by mass to 70% by mass.

7. A membrane electrode assembly for a solid polymer fuel cell, comprising:
an anode comprising a first gas diffusion layer and a first catalyst layer provided at one surface side of the first gas diffusion layer;
a cathode comprising a second gas diffusion layer and a second catalyst layer provided at one surface side of the second gas diffusion layer; and
a polymer electrolyte membrane disposed between the first catalyst layer and the second catalyst layer,
wherein at least one of the first catalyst layer or the second catalyst layer is the catalyst layer according to claim 1.

8. A solid polymer fuel cell, comprising the membrane electrode assembly for a solid polymer fuel cell according to claim 7.

9. The catalyst layer according to claim 1, wherein the occupancy rate of the ionomer in the total volume of the mesopores having a pore diameter of from 2 nm to less than 10 nm is 10% to 50% by volume.

10. The catalyst layer according to claim 1, wherein the content of the ionomer with respect to 100 parts by mass of the carbon carrier is 100 to 180 parts by mass.

11. The catalyst layer according to claim 1, wherein:
the occupancy rate of the ionomer in the total volume of the mesopores having a pore diameter of from 2 nm to less than 10 nm is 10% to 50% by volume; and
the content of the ionomer with respect to 100 parts by mass of the carbon carrier is 100 to 180 parts by mass.

* * * * *